(12) United States Patent
Andrapalliyal et al.

(10) Patent No.: US 7,564,802 B2
(45) Date of Patent: Jul. 21, 2009

(54) METHOD FOR OPTIMAL ASSIGNMENT OF CUSTOMER EDGE (CE) ROUTERS TO VIRTUAL PRIVATE NETWORK ROUTE FORWARDING (VRF) TABLES

(75) Inventors: Bala Andrapalliyal, Bedminster, NJ (US); Frank Feather, Englishtown, NJ (US); Tejas Naik, Edison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 623 days.

(21) Appl. No.: 11/089,801

(22) Filed: Mar. 25, 2005

(65) Prior Publication Data

US 2006/0215578 A1    Sep. 28, 2006

(51) Int. Cl.
*H04L 12/28* (2006.01)
*H04L 12/56* (2006.01)
(52) U.S. Cl. .................. 370/254; 370/395.31; 370/420
(58) Field of Classification Search .......... 370/254, 370/395.31, 420; 709/238
See application file for complete search history.

(56) References Cited

U.S. PATENT DOCUMENTS

| | | | | |
|---|---|---|---|---|
| 7,116,665 B2 * | 10/2006 | Balay et al. | ............ | 370/392 |
| 7,283,529 B2 * | 10/2007 | Basso et al. | ............ | 370/392 |
| 7,307,990 B2 * | 12/2007 | Rosen et al. | ............ | 370/392 |
| 7,359,404 B1 * | 4/2008 | Allan | ............ | 370/469 |
| 2004/0255028 A1 * | 12/2004 | Chu et al. | ............ | 709/227 |
| 2006/0182037 A1 * | 8/2006 | Chen et al. | ............ | 370/252 |

OTHER PUBLICATIONS

Eric. C. Rosen and Yakov Rekhter, BGP/MPLS IP VPNs, Sep. 2003, The Internet Society, pp. 4-5, 7, 11-13, 15, 20 and 29.*
Pedro Marques, Robert Raszuk, Dan Tappan, and Luca Martini, RFC2547bis networks Using Internal BGP as PE-CE protocol, Apr. 2003, Internet Engineering Task Force, p. 2.*
MPLS VPN Suport for EIGRP Between Provider Edge and Customer Edge, 2003, Cisco Systems, Inc., Cisco IOS Release 12.0(22)S, 12.2(15)T, 12.2(18)S, and 12.0(27)S, p. 3.*
MPLS VPN Support for EIGRP Between Provider and Customer Edge, 2003, Cisco Systems, Inc., Cisco IOS Release 12.0(22), 12.2(15)T, 12.2(18)S, and 12.0(27)S, p. 3.*

* cited by examiner

*Primary Examiner*—Chirag G Shah
*Assistant Examiner*—Ashley L Shivers

(57) ABSTRACT

A method for optimal assignment of customer edge (CE) routers to virtual private network route forwarding (VRF) tables uses a "peer model", in which the CE routers communicate their routes to a Service Provider's edge routers (PE routers). The routes of a particular VPN are then exchanged among the PE routers that are attached to that VPN. This is accomplished in a manner which ensures that routes from different VPNs remain distinct and separate, even if two VPNs comprise an overlapping address space. The PE routers distribute, to the CE routers in a particular VPN, the routes from other CE routers in that VPN. The CE routers do not peer with each other and, as such, there is no "overlay" visible to a VPN's routing algorithm.

19 Claims, 14 Drawing Sheets

100

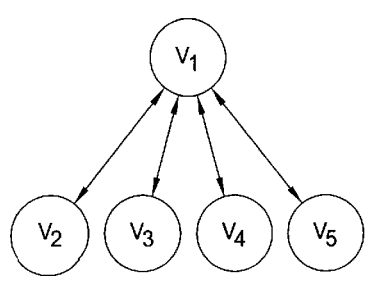
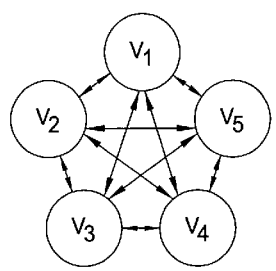
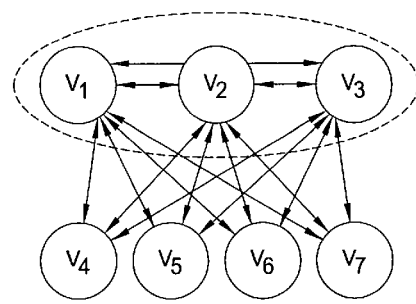
(A) SINGLE HUB-AND-SPOKE    (B) FULL-MESH    (C) MULTI HUB-AND-SPOKE
FIG. 5

Router $CE_X$ has the following properties:
{ $CUST_A$ , $ASN_X$ , $IF_{XY}$ , $PE_Y$ , $VPN_X$ }
Being a new CE, $VPN_X$ is empty.

602 — We want to attach $CE_X$ to $VPN_m$

604 — On $PE_Y$, find a $VRF_{Yn}$ such that:
   $VPN_{Yn}$ = { $VPN_m$ }, and   // VRF has only one VPN, $VPN_m$
   $VRF_{Cust}$ = $Cust_A$        // VRF belongs to the CE customer 606 — IF $VRF_{Yn}$ exists
   THEN Attach $CE_X$ to $VRF_{Yn}$
608 — ELSE Create new $VRF_{YN+1}$ with the following properties:
   { $PE_Y$, VPN = { $VPN_m$ }, RT for $VPN_m$, $IF_{Yn}$ = { $IF_{XY}$ }, $CUST_A$ }
   Attach $CE_X$ to $VRF_{YN+1}$ via interface $IF_{Yn}$

FIG. 6
600

$CE_X$ is the CE we will be adding to the new VPN. Router $CE_X$ has the following properties:
{ $CUST_A$ , $ASN_X$ , $IF_{XY}$ , $PE_Y$ , $VPN_X$ }
Since CE already belongs to another VPN (or VPNs), $VPN_X$ is non-empty:

$$VPN_X = \{ VPN_{X1}, VPN_{X2}, VPN_{X3}, \ldots, VPN_{XM} \}$$

702 — $CE_X$ is connected to $VRF_A$ and we want to attach $CE_X$ to $VPN_m$
$VRF_A$ has the following properties:
{ $RD_A$ , $PE_Y$ , $VPN_X$ , RT(s) , $IF_{Yn}$, $CUST_A$ }

704 — IF $CE_X$ is the only CE connected to $VRF_A$
    THEN // Try to find a VRF with the same customer, $CUST_A$, and
        //   the same set of VPNs (including the new VPN, $VPN_m$ )
706 —   On $PE_Y$, find a $VRF_{Yn}$ such that:
        $VPN_{Yn}$   = { $VPN_X$ + $VPN_m$ } &   // VRF has same VPNs.
        $VRF_{Cust}$   = $CUST_A$       // VRF has the same customer
    IF such a VRF exists,
708 —   THEN // Connect $CE_X$ to $VRF_{Yn}$ , i.e.,
        //   merge VRFs
708-1 —   Dis-associate $CE_X$ with $VRF_A$
708-2 —   Associate it with $VRF_{Yn}$
        Delete $VRF_A$
710 — ELSE Add the $VPN_m$ $RT_M$ to the $VRF_A$
    ELSE // There are many CEs (including $CE_X$) connected to $VRF_A$
712 — // Try to find a VRF with the same customer
        //   and the same set of VPNs (inc the new VPN)
    On $PE_Y$, find a $VRF_{Yn}$ such that:
        $VPN_{Yn}$   = { $VPN_X$ + $VPN_m$ } &   // VRF has same VPNs.
        $VRF_{Cust}$   = $CUST_A$       // VRF has the same customer
    IF such a VRF exists,
    THEN // Split $CE_X$ from $VRF_A$ , and merge with $VRF_{Yn}$
714 — Dis-associate $CE_X$ with $VRFA_A$
716 — Associate $CE_X$ it with $VRF_{Yn}$
    ELSE // Split $CE_X$ from $VRF_A$ and
        //   create a new VRF (Figure 10)
718 — Create a new VRF with the same set of RT's as $VRF_A$
720 — Add $RT_m$ to the new VRF
722 — Disassociate $CE_X$ with $VRF_A$
724 — Associate $CE_X$ with the new VRF

FIG. 7

802 — Router $CE_X$ has the following properties:
$\{ CUST_A, ASN_X, IF_{XY}, PE_Y, VPN_X \}$
where $VPN_X$ is the VPNs which $CE_X$ participates:
$VPN_X = \{ VPN_{X1}, VPN_{X2}, VPN_{X3}, ..., VPN_{XM} \}$ $CE_X$ is connected to $VRF_A$ which has the following properties:
$\{ RD_A, PE_Y, VPN_X, RT(S), IF_{Yn}, CUST_A \}$
We want to remove $CE_X$ from $VPN_{X1}$ 804 — IF $CE_X$ is not in any other VPN's (i.e., $VPN_X = \{ VPN_{X1} \}$)
THEN { // Delete scenario
806 — Disassociate $CE_X$ from $VRF_A$:
  Delete CE-Facing Interface
  Delete BGP neighboring (see protocol considerations)
  IF $VRF_X$ has no other CE connections
    THEN Delete $VRF_A$}

808 — ELSE { // $CE_X$ (and $VRF_A$) participates in several VPNs
   IF $CE_X$ is the only CE connected to $VRF_A$
810 — THEN { // Remove $VPN_{X1}$ from $VRF_A$
  Delete the RT associated with $VPN_{X1}$ from $VRF_A$
  Hence, $newVPN_X = \{ VPN_{X2}, VPN_{X3}, ..., VPN_{XM} \}$
812 — // Next, try to merge the new $VRF_A$ with another
  //   VRF that has the same properties
  $newVRF_A = \{ RD_A, PE_Y, newVPN_X, RT(s), IF_{Yn}, CUST_A \}$
  IF none of the VPNs in $newVPN_X$ are hub-and-spoke VPNs
    THEN MERGE ($newVRF_A$, $PE_Y$) }

ELSE { // $VRF_A$ has other CE connections
  // Split $CE_X$ from $VRF_A$ and
  //   either find another VRF to associate $CE_X$ with, or
  //   create a new VRF.
  On $PE_Y$, find a $VRF_{Yn}$ such that:
    $VPN_{Yn} = \{ newVPN_X \}$ &  // VRF has same VPNs.
    $VRF_{Cust} = CUST_A$  // VRF has the same customer
814 — IF such a VRF, $VRF_{Yn}$, exists
    THEN
816 — Disassociate $CE_X$ with $VRF_A$   // Split
818 — Associate $CE_X$ with $VRF_{Yn}$  // Merge
    ELSE  // Split
820 — Create a new VRF with the same set of RT's as $VRF_A$
        minus the RT for $VPN_{X1}$
822 — Disassociate $CE_X$ with $VRF_A$
824 — Associate $CE_X$ with the new VRF}

FIG. 8
800

852 — newVRF$_A$ has the following properties:
$\{ RD_A , PE_Y , newVPN_X , RT(s), IF_{Yn} , CUST_A \}$
Where
  newVPN$_X$ = $\{ VPN_{X2} , VPN_{X3} , \ldots , VPN_{XM} \}$
We want to merge as in step 812

854 — On PE$_Y$, find a VRF$_{Yn}$ such that:
  VPN$_{Yn}$ = $\{ newVPN_X \}$ &   // VRF has same VPNs.
  VRF$_{Cust}$ = CUST$_A$   // VRF has the same customer IF such a VRF, VRF$_{Yn}$, exists
  THEN
856 —     // Move all CEs connected to newVRF$_A$ to VRF$_{Yn}$
    FOR each interface in IF$_{Yn}$ = $\{ IFY_{Yn1} , \ldots , IF_{YnZ} \}$
      Disassociate IF$_{Ynz}$ from newVRF$_A$
        Associate IF$_{Ynz}$ with VRF$_{Yn}$
858 — Delete newVRF$_A$

Router $CE_X$ has the following properties:
  { $CUST_A$ , $ASN_X$ , $IF_{XY}$ , $PE_Y$ , $VPN_X$ }
Being a new CE, $VPN_X$ is empty.

902 — We want to attach $CE_X$ to $VPN_m$

904 — Create new $VRF_{YN+1}$ on $PE_Y$ with the following properties:
  { $PE_Y$, VPN = { $VPN_m$ }, RT for $VPN_m$, $IF_{Yn}$ = { $IF_{XY}$ }, $CUST_A$ }
Attach $CE_X$ to $VRF_{YN+1}$ via interface $IF_{Yn}$

$CE_X$ is the CE we will be adding to the new VPN.
Router $CE_X$ has the following properties:
  { $CUST_A$ , $ASN_X$ , $IF_{XY}$ , $PE_Y$ , $VPN_X$ }
Since CE already belongs to another VPN (or VPNs), $VPN_X$ is non-empty:
  $VPN_X$ = { $VPN_{X1}$, $VPN_{X2}$ , $VPN_{X3}$ , ... , $VPN_{XM}$ }

1002 —— $CE_X$ is connected to $VRF_A$ and we want to attach $CE_X$ to $VPN_m$
        $VRF_A$ has the following properties:
           { $RD_A$ , $PE_Y$ , $VPN_X$ , RT(s) , $IF_{Yn}$ , $CUST_A$ }

1004 —— IF $CE_X$ is the only CE connected to $VRF_A$
1006 —— THEN Add the $VPN_m$ to the $VRF_A$
        ELSE // There are many CEs (including $CE_X$) connected to $VRF_A$
             // Split $CE_X$ from $VRF_A$ and
             //   create a new VRF
1008 —————— Create a new VRF with the same set of RT's as $VRF_A$
   1010 ———— Add the RTs for the Hub/Spoke to the new VRF
   1012 ———— Disassociate $CE_X$ with $VRF_A$
   1014 ———— Associate $CE_X$ with the new VRF

1102 — $CE_X$ is the CE we will be removing from $VPN_{X1}$
Furthermore, $CE_X$ is a hub or spoke CE in the $VPN_{X1}$
Router $CE_X$ has the following properties:
  { $CUST_A$, $ASN_X$, $IF_{XY}$, $PE_Y$, $VPN_X$ }
where $VPN_X$ is the VPNs which $CE_X$ participates:
  $VPN_X$ = { $VPN_{X1}$, $VPN_{X2}$, $VPN_{X3}$, ... , $VPN_{XM}$ }

$CE_X$ is connected to $VRF_A$ which has the following properties:
  { $RD_A$, $PE_Y$, $VPN_X$, RT(s), $IF_{Yn}$, $CUST_A$ }

1104 — We want to remove $CE_X$ from $VPN_{X1}$
1106 — IF $CE_X$ is not in any other VPN's (i.e., $VPN_X$ = { $VPN_{X1}$ } )
    THEN { // Delete scenario
      Disassociate $CE_X$ from $VRF_A$:
        Delete CE-Facing Interface
        Delete BGP neighboring (see protocol considerations)
1108 — IF VRFX has no other CE connections
      THEN Delete $VRF_A$}

1110 — ELSE { // $CE_X$ (and $VRF_A$) participates in several VPNs
    IF $CE_X$ is the only CE connected to $VRF_A$
1112 — THEN { // Remove $VPN_{X1}$ from $VRF_A$
      Delete the RT associated with $VPN_{X1}$ from $VRF_A$
      Hence, $newVPN_X$ = { $VPN_{X2}$, $VPN_{X3}$, ... , $VPN_{XM}$ }
1114 — // Next, try to merge the new $VRF_A$ with another
      //   VRF that has the same properties
      $newVRF_A$ = { $RD_A$, $PE_Y$, $newVPN_X$, RT(s), $IF_{Yn}$, $CUST_A$ }
      IF none of the VPNs in $newVPN_X$ are hub-and-spoke VPNs
        THEN *MERGE* ($newVRF_A$, $PE_Y$)}

ELSE { // $VRF_A$ has other CE connections
      // Split $CE_X$ from $VRF_A$ and
      //   create a new VRF.
1116 — Create a new VRF with the same set of RT's as $VRF_A$
        minus the RT for $VPN_{X1}$
1118 — Disassociate $CE_X$ with $VRF_A$
1120 — Associate $CE_X$ with the new VRF

FIG. 11

METHOD FOR OPTIMAL ASSIGNMENT OF CUSTOMER EDGE (CE) ROUTERS TO VIRTUAL PRIVATE NETWORK ROUTE FORWARDING (VRF) TABLES

FIELD OF THE INVENTION

The present invention relates to virtual private networks (VPNs) and, more specifically, to a method for the assignment of customer edge routers to virtual private network route forwarding (VRF) tables such that the number of VRF tables needed in implementing a VPN is minimized.

BACKGROUND OF THE INVENTION

Border Gateway Protocol-Multi-Protocol Label Switching virtual private networks (BGP/MPLS VPN) is a mechanism that is defined under Request for Comment 2547 (RFC 2547), which allows service providers to use their IP backbone to provide VPN services for their customers. This mechanism is based on using BGP to distribute VPN routing information to the routers in the backbone network, and using MPLS to forward VPN traffic. MPLS tunnels may already exist or may be created dynamically when needed, which relieves service providers of pre-provisioning large numbers (e.g., tens of thousands) of tunnels. BGP/MPLS VPNs allow service providers to define any arbitrary topology with any number of nodes in a VPN. A service provider can create multiple VPNs using the same core network and typically supports numerous customer VPNs across its network.

The VPN is implemented on provider edge (PE) routers to which customer edge (CE) routers are attached or assigned. The CE router(s) are connected to a PE router via an interface which is associated with a VPN Route Forwarding (VRF) table. Several CE routers may be attached to the same PE router, and even associated with the same VRF. For example, there could be four CE routers in two overlapping VPNs (e.g., CE routers 1 & 2 in VPN1 and CE routers 2, 3 & 4 in VPN2, yet CE routers 3 & 4 attach to the same PE router and the same VRF).

One goal of a service provider for such networks is to minimize the number of VRFs used for implementing the VPNs in the network. This may be accomplished by analyzing the routers, the VRFs and their VPN participation and then reconfiguring all VRF(s) in the network and reassigning CE(s). This procedure is similar to Traffic Engineering the VRFs. However, like Traffic Engineering in Multi-Protocol Label Switching (MPLS), this procedure may be costly and potentially disrupt the VPNs while implementing an optimal design.

An alternative optimization method for minimizing the number of VRFs used for implementing the VPNs in a network is a local optimization method. In such a method, VPNs may be created or modified (i.e., sites added to existing VPN) and VRFs may be created or modified on a PE router so as to maintain an optimal VPN configuration. Such local optimization, however, requires maintaining correct configurations for the VPN(s) on each respective PE router.

SUMMARY OF THE INVENTION

The present invention addresses the deficiencies of the prior art by providing a method for optimal assignment of customer edge (CE) routers to virtual private network route forwarding (VRF) tables in which the CE routers communicate their routes to a service provider's edge routers (PE routers). In various embodiments of the present invention, a VPN configuration is optimized such that, while creating or modifying VPNs to minimize a number of VRFs used for implementing the VPNs in the network, the method maintains correct VPN configuration on a respective provider edge (PE) router.

BRIEF DESCRIPTION OF THE DRAWINGS

The teachings of the present invention can be readily understood by considering the following detailed description in conjunction with the accompanying drawings, in which:

FIGS. 5(*a*)-(*c*) depict high level block diagrams of the VRF configuration with the Route Targets for the three virtual private network topologies;

FIG. 6 depicts an embodiment of a method of the present invention for connecting a new CE router to a VPN;

FIG. 7 depicts an embodiment of a method of the present invention for adding an existing CE to a different VPN;

FIG. 8 depicts an embodiment of a method of the present invention for removing an existing CE router from a VPN;

FIG. 8*a* depicts an embodiment of a method of the present invention for the merge process of the method of FIG. 8;

FIG. 9 depicts an embodiment of a method of the present invention for connecting a new CE router to a Hub-and-Spoke VPN;

FIG. 10 depicts an embodiment of a method of the present invention for adding an existing CE router to a Hub-and-Spoke VPN;

FIG. 11 depicts an embodiment of a method of the present invention for removing an existing CE router from a Hub-and-Spoke VPN;

To facilitate understanding, identical reference numerals have been used, where possible, to designate identical elements that are common to the figures.

DETAILED DESCRIPTION OF THE INVENTION

The present invention advantageously provides a method for optimal assignment of customer edge (CE) routers to virtual private network route forwarding (VRF) tables. Although various embodiments of the present invention are described herein with respect to a Multi-Protocol Label Switching (MPLS) Virtual Private Network (VPN), the specific embodiments of the present invention should not be treated as limiting the scope of the invention.

It will be appreciated by those skilled in the art and informed by the teachings of the present invention that the concepts of the present invention may be applied in many other network service architectures utilizing VPNs and specifically utilize VRFs or RTs (Routing Tables) to define VPN membership. This can include layer 3 VPNs as described in RFC 2547, and layer 2 VPNs for Virtual Private LAN Service (VPLS). Generally speaking, the invention is applicable to any network architecture in which VRFs or structures similar to VRFs are used to adapt the operation of point to point or point to multi-point VPNs or similar network connections.

Figure 1:
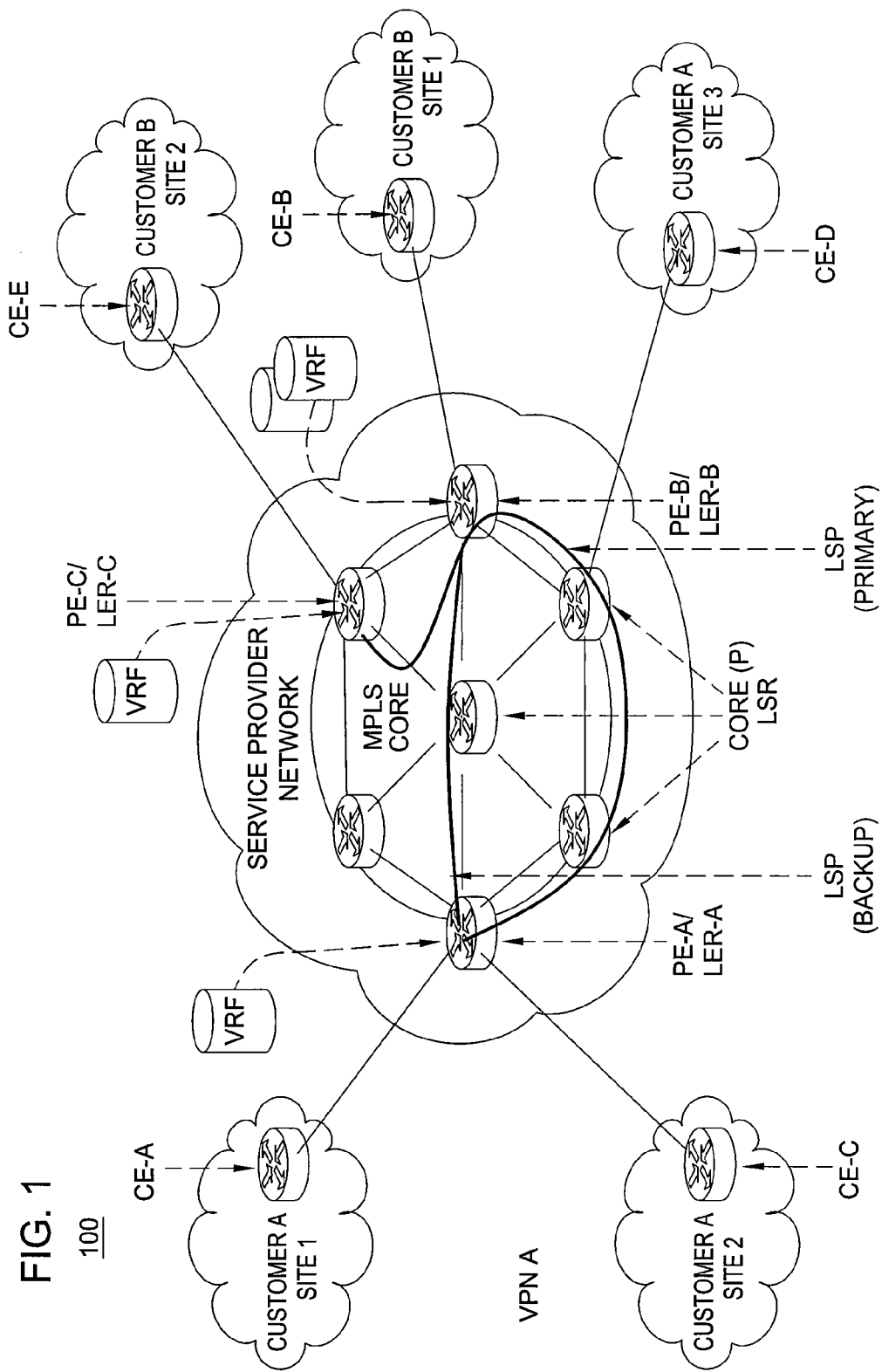
FIG. 1 depicts a high level block diagram of a Multi-Protocol Label Switching (MPLS) Virtual Private Network (VPN)

Within the context of RFC 2547, a customer site (or more specifically a customer router referred to as a CE router) is connected to the service provider network (or more specifically, an edge router on the provider's core network referred to as the PE router) by one or more ports. For example, FIG. 1 depicts a high level block diagram of a Multi-Protocol Label Switching (MPLS) Virtual Private Network (VPN) 100. In the MPLS VPN 100 of FIG. 1, customer router CE-A is connected to provider edge router PE-A through one port and customer router CE-C is connected to the same provider edge router PE-A through another port. Thus, multiple CEs could be connected to the same PE as shown in the figure. Within the core network, the PE routers serve as MPLS Label Edge Routers (LER) originating or terminating MPLS tunnels. The provider routers (or P routers) function as MPLS Label Switch Routers (LSR) forwarding VPN traffic between PE routers.

In various embodiments, CE and PE routers exchange routing information using such routing protocols as RIPv2, OSPF, EIGRP or EBGP. Or, in some cases, static routes will be implemented for routing traffic between the CE and PE. A CE router advertises the customer site's local VPN routes to the PE router and learns remote VPN routes from the PE router. After learning local VPN routes from CE routers, a PE router exchanges this VPN routing information with other PE routers using an extended form of BGP called MultiProtocol BGP (MP-BGP). The service provider associates each of the incoming ports at a PE router to a VPN Routing and Forwarding (VRF) table. This table contains VPN routing information exchanged by the PE router with the CE router connected to that port. For example, in FIG. 1, PE-B has two VRFs: one contains VPN routing and forwarding information exchanged with CE-B while the other contains information exchanged with CE-D.

A BGP extended community attribute called the Route Target (RT) attribute identifies a collection of VRFs to which a PE router distributes routes. A PE router uses this attribute to export local routes to other VRFs and to constrain the import of remote routes into its own VRFs. For example, in FIG. 1 assume that VRF-A on PE-A exports a route target and VRF-B on PE-B imports this route target. This means, the CE router (CE-B) corresponding to VRF-B knows how to reach the host behind the CE router (CE-A) corresponding to VRF-A. In order for CE-A to reach hosts behind CE-B, VRF-B needs to export an RT and VRF-A needs to import this RT as well. Once this is done, bi-directional traffic can flow between hosts behind CE-A and hosts behind CE-B. This means, a bi-directional VPN link is established between VRF-A and VRF-B. Thus, the RT membership in the VRFs defines the topology of the VPNs. It should be noted that herein when the inventors refer to traffic flow between VRFs, the inventors are referring to traffic flow between the CEs connected to the port on the PE routers on which these VRFs are defined.

Figure 2:
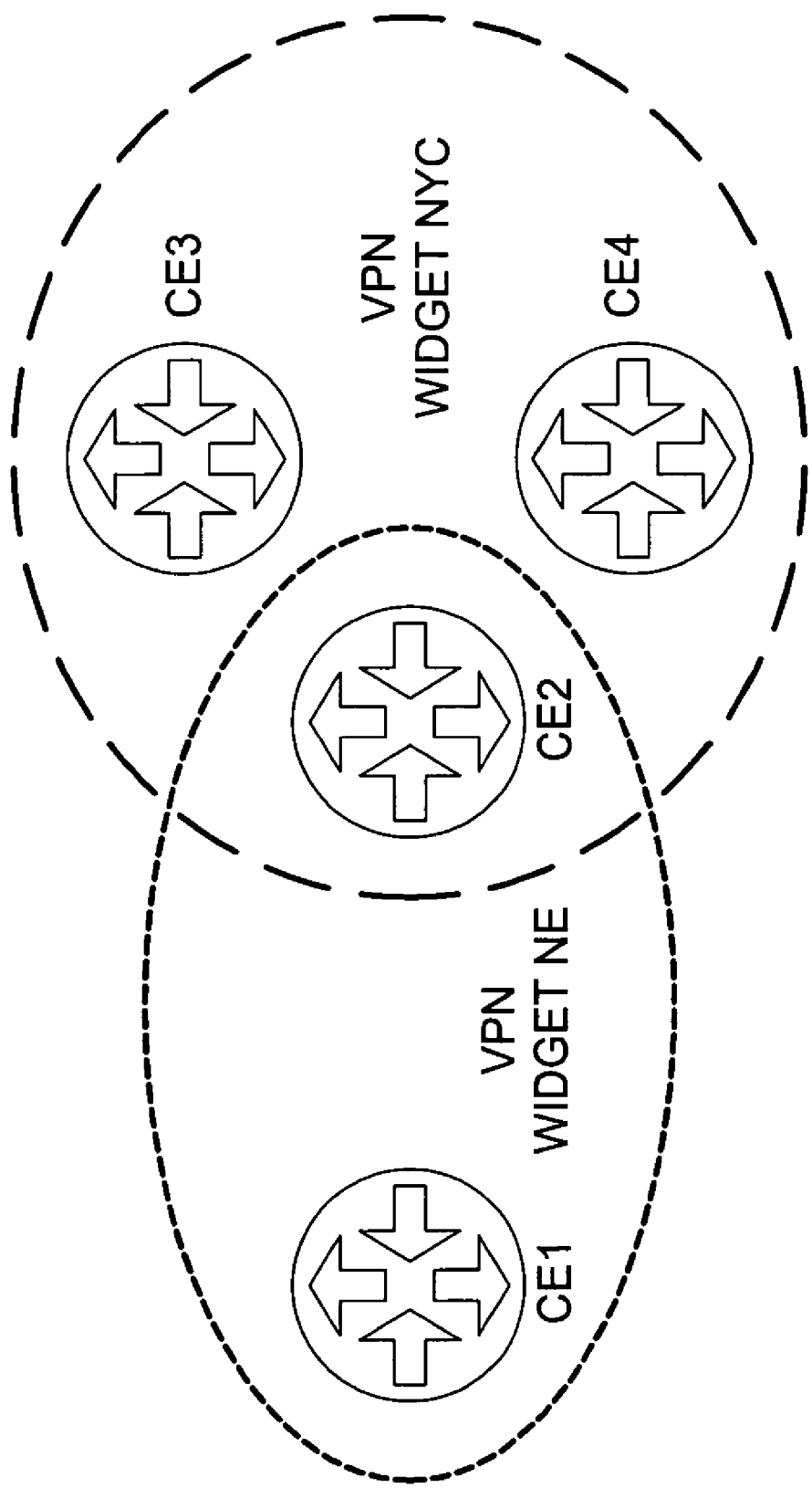
FIG. 2 depicts a high level conceptual block diagram of two overlapping VPNs.

As previously mentioned, a service provider has a network of 2547 VPNs, which connects customer sites (CE routers). Some of the VPNs may be intersecting or overlapping (i.e., a CE is participating in two different VPNs). FIG. 2 depicts a high level conceptual block diagram of two overlapping VPNs. More specifically, FIG. 2 illustratively comprises a first VPN, VPN 'Widget NE', and a second VPN, VPN 'Widget NYC'. The first VPN, VPN 'Widget NE' comprises a first CE router, CE1, and a second CE router, CE2. The second VPN, VPN 'Widget NYC', comprises a third CE router, CE3, and a fourth CE router, CE4. As depicted in FIG. 2, however the second CE router, CE2, is an overlapping CE router that is included in the first VPN, VPN 'Widget NE', and the second VPN, VPN 'Widget NYC'.

Figure 3:
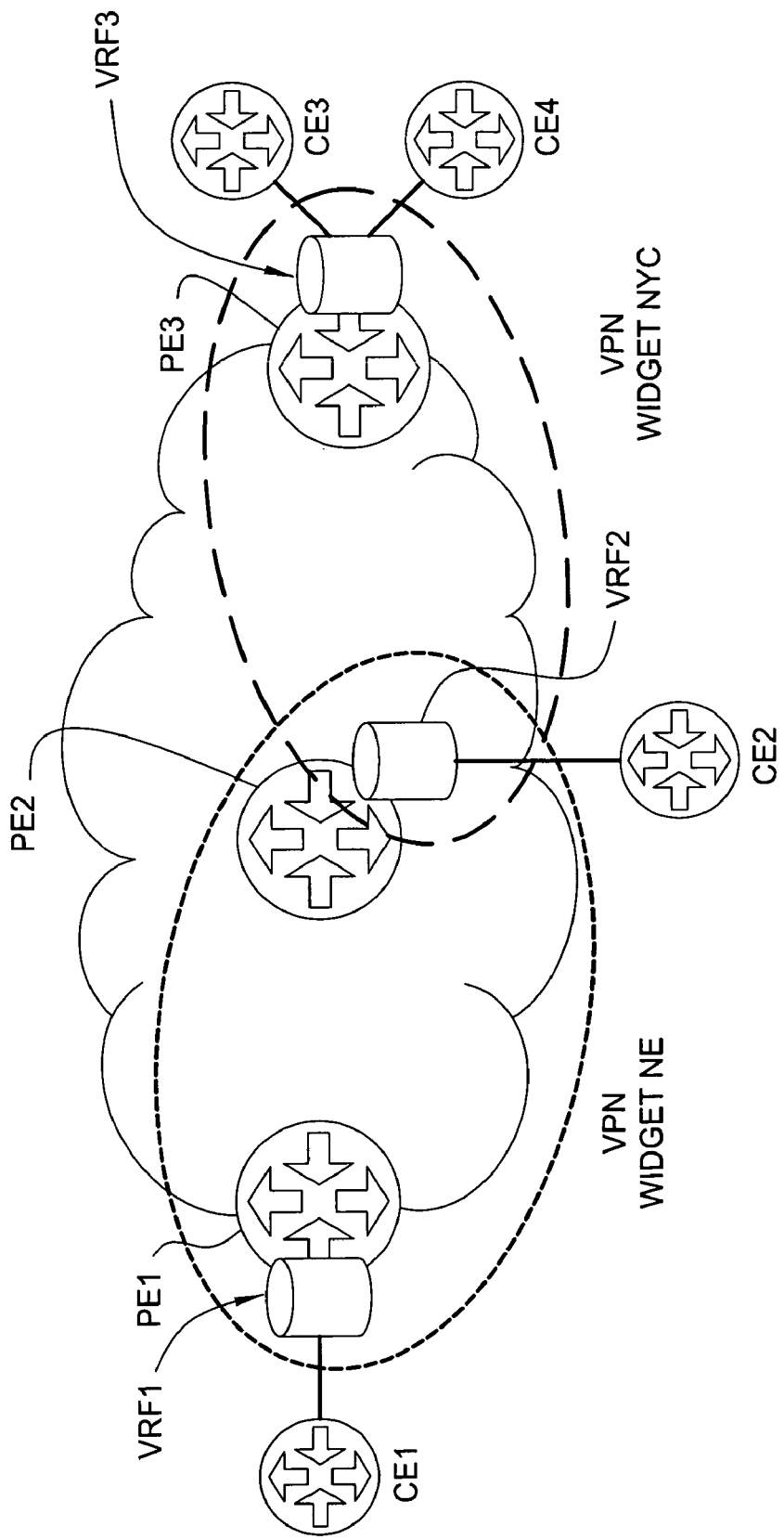
FIG. 3 depicts a high level block diagram of an embodiment of a PE router placement and VRF table placement for the two overlapping VPNs of FIG. 2.

The VPNs are implemented on provider edge (PE) Routers to which the CE routers are attached. The CEs are connected to a PE via an interface, which is associated with a VPN Route Forwarding (VRF) table. Several CE routers may be attached to the same PE, and even associate with the same VRF. For example, FIG. 3 depicts a high level block diagram of an embodiment of a PE router placement and VRF table placement for the two overlapping VPNs of FIG. 2. In FIG. 3 the four CE routers, CE1-CE4, in the two VPNs, VPN 'Widget NE', and VPN 'Widget NYC', of FIG. 2 may actually be implemented in a Service Provider network using three PE routers, PE1, PE2 and PE3, including one VRF table, VRF1-VRF3, for each PE router. However, it should be noted that for one of the PE routers, (PE3), the third CE router, CE3, and the fourth CE router, CE4, attach to the same VRF table, VRF3.

Figure 4:
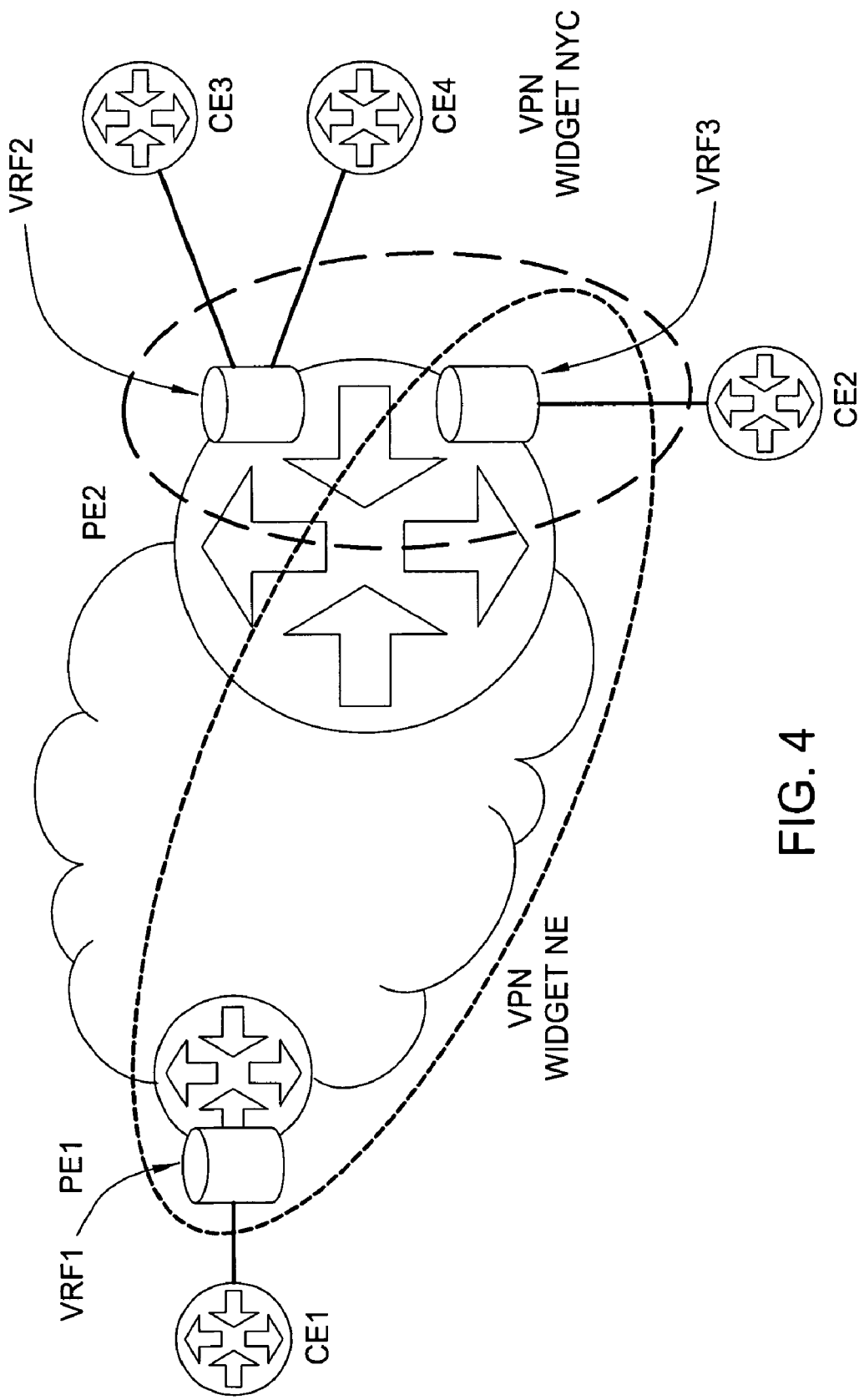
FIG. 4 depicts a high level block diagram of an alternate embodiment of a PE router configuration and a VRF table configuration for the two overlapping VPNs of FIG. 2.

An alternate implementation of a PE router and VRF table configuration for the two overlapping VPNs of FIG. 2 is depicted in FIG. 4. In FIG. 4, three of the CE routers, CE2-CE4, are located in the second VPN, VPN 'Widget NYC', and are connected to the same PE router, PE2. It should be noted, however, that in this alternate implementation of FIG. 4, only two PE routers, PE1 and PE2, are used although three VRF tables, VRF1-VRF3, are still required. In the embodiment of FIG. 4, the first PE router, PE1, still only comprises a single VRF table, VRF1, however the second PE router, PE2, comprises two VRF tables, VRF2 and VRF3. The reason for having two VRF tables, VRF2 and VRF3, on the second PE router, PE2, will be described in greater detail below.

The actual assignment of a CE router to a PE router and to a VRF table depends on many factors, including the physical topology (how the CE routers are attached to the PE routers), VPN membership, and customer details. More specifically, the assignment of a CE router to a PE router and to a VRF table constitutes connecting the CE to an existing VRF table, or creation of a new VRF table. If the CE is already part of a VPN—and hence already attached to a VRF table—the VRF table will need to be modified or possibly a new VRF table created. In the present invention, the inventors propose a method for the assignment of a CE router(s) to a PE router and to a VRF table, such that accuracy of the VPN(s) is maintained and the number of VRF tables required is minimized. A correct VPN design means that there will be no crosstalk between VPNs. That is, a CE router will only participate in the VPN, or VPNs, of which it is part. Minimizing the number of VRFs will save on PE router resources, and simplify maintenance of the VPNs.

The embodiments of the method of the present invention are described herein using several basic assumptions about VPNs, their topologies, and how they are configured in the network. Although the VPN is typically implemented to join CE routers, the VRF tables and their route targets (RTs) define the VPN. The topologies that are normally provisioned are:

Single hub-and-spoke: In this topology, a single hub VRF can send and receive VPN traffic to a set of spoke VRFs. The spokes, however, do not exchange VPN traffic with each other.

Full-Mesh: In this topology, the VRFs exchange VPN traffic with each other, that is, the VRFs are completely connected.

Multi hub-and-spoke: In this topology, a set of hub VRFs can exchange VPN traffic among each other, and exchange VPN traffic with the spoke VRFs. The spokes, however, do not exchange VPN traffic with each other.

FIGS. 5(*a*)-(*c*) depict high level block diagrams of the three VPN topologies. For example, FIG. 5(*a*) depicts a high level block diagram of a Single hub-and spoke VPN topology. The Single hub-and spoke VPN topology of FIG. 5(a) illustratively comprises five VRF tables, $V_1$-$V_5$. In the Single hub-and spoke VPN topology of FIG. 5(a), VRF table $V_1$ is functioning as a hub and the remaining VRF tables, $V_2$-$V_5$ are the spokes.

FIG. 5(b) depicts a high level block diagram of a full-mesh VPN topology. The full-mesh VPN topology of FIG. 5(b) illustratively comprises five VRF tables, $V_1$-$V_5$ where all VRF tables exchange VPN traffic.

FIG. 5(c) depicts a high level block diagram of a Multi hub-and-spoke VPN topology. The Multi hub-and-spoke VPN topology of FIG. 5(c) illustratively comprises seven VRF tables, $V_1$-$V_7$. In the Multi hub-and-spoke VPN topology of FIG. 5(c), VRF tables $V_1$-$V_3$ function as hubs and the remaining VRF tables, $V_4$-$V_7$ are the spokes.

FIGS. 5(a)-(c) each further depict a respective VRF-RT table for each of the topologies. A VRF-RT table is used to represent the export-import relationship between the VRF tables and the RTs. In the VRF-RT tables of FIGS. 5(a)-(c), an E entry denotes that the RT represented by the row is being exported by the VRF represented by the column. Similarly, an I entry denotes an import. A B entry denotes that the RT represented by the row is being both imported and exported by a VRF represented by the column.

The topologies of FIGS. 5(a)-(c) are provisioned with a minimum number of RTs. As depicted in FIGS. 5(a)-(c), for a full-mesh topology, only one RT is needed, which is used on all the VRFs and is exported and imported by all VRFs. A single hub-and-spoke or a multi hub-and-spoke will use two RTs: one RT, called the "Hub" RT, is exported by the VRF(s) on the hub(s), and imported by the spoke VRFs; and the second RT, called the "Spoke" RT, is exported by the spoke VRFs, and imported by all the hub(s). In addition, for the multi hub-and-spoke topology of FIG. 5(c), the "Hub" RT ($r_4$ in FIG. 5(c)) is imported by the hub VRFs so that the hubs exchange routes (i.e., the hubs are full-meshed).

When creating a VPN, a VRF will have one or more CE routers attached to it, and CE routers inherit the topology of the VRF. Hence, if a VRF is part of a full-mesh topology, all CE routers attached to the VRF are full-mesh. Likewise, a CE attached to a Hub VRF is considered a Hub CE. In the most simple case, a single VRF can constitute a VPN, if that VRF has more than one CE router attached to it. That single VRF, however, would be considered a full-mesh topology.

With regard to how CE routers are attached to the VRF, it is assumed that a multi-site Hub or Spoke VRF (i.e., a VRF with more than one CE attached) is not allowed. That is, for Hub-and-Spoke VRFs, there is only one CE router per VRF. The rationale is that if multiple Spoke CEs go to the same (spoke) VRF, the CEs wouldn't be true spokes since the CEs would exchange routes. Furthermore, although two (or more) Hub CEs are attached to the same VRF would be equivalent to a multiple-hub scenario, it creates a single point of failure for the two hubs, which defeats the purpose of multiple hubs. As such, only one CE is allotted per hub VRF.

The three basic parameters of a VPN are 1) the VPNName, which usually consists of a human readable name, a VPN-ID, and, optionally, the primary customer that the VPN is serving; 2) the Route Target(s) used to implement the VPN; and 3) VRFs that make up the VPN. The import/export configuration of the RTs on the VRFs determines the topology of the VPN. A VRF may be part of multiple VPNs, depending on the configuration of the RTs on. The VRF is also identified by the PE router it is on, and the interfaces associated with the VRF. CE routers are attached to the VRF via those interfaces associated with the VRF. As such, a VRF may be identified using at least the following properties:

The PE router it is on;
The Route Distinguisher (RD);
The VPNName(s);
The RT(s) used to implement the VPN(s); and
CE-facing interfaces.

Similarly, the following are three identifiable properties of a CE router:
The customer the CE belongs to;
The Autonomous System Number (ASN) of the CE, where applicable; and
The PE(s) to which the CE is connected. The CE is attached to a PE via a specific PE interface (a PVC, VLAN, T1, etc.).

Since customer is an important property of the CE, it is also important to keep track of the primary customer of a VRF. When provisioning CE routers to connect to a VRF, the operators must be aware of what customer sites are connecting to the VRF. In general, different customers should not connect to the same VRF. Likewise, it is important to know what VPNs a CE is part of, which is determined by the VRFs it is attached to. In most cases, the ASN of the CE can be ignored. The exception is if the CE-PE protocol is Extended Interior Gateway Routing Protocol (EIGRP): all CEs that are attached to a VRF must be the same ASN if the CE-PE protocol is EIGRP (as described in more detail below).

As previously stated, a correct design means that if a CE router is a member of a VPN, or VPNs, the CE router will be able to communicate (exchange routes and send traffic) only with other CEs in the VPN, or VPNs. The CE router will not exchange traffic or routing with VPNs in which the CE is not a member. In accordance with the present invention, there are some basic rules for how CE routers are attached to VRF tables on a PE router, and abiding by these rules maintains the correctness of the VPN. Some of these rules are:

a. CE routers from two different Customers cannot connect to the same VRF.
    b. All CE routers connected to a VRF must be in the same VPN(s) (i.e., a CE router participates in all VPNs that the VRF table contains).
    c. Multi-site Hub or Spoke topologies will not be allowed. That is, multiple CE routers cannot connect to a Hub or Spoke VRF table.

In accordance with the above rules, the following corollaries exist:

d. For Hub-and-Spoke topologies, there is always a one-to-one CE router to VRF table relationship.
    e. Multiple CE routers on a VRF table are only allowed in a full mesh VPN.

In disclosing the methods of the present invention, the discussion will be divided herein into the full-mesh case and the hub-and-spoke case. The hub-and-spoke case will include a single or multiple hub-and-spoke architecture. The discussion will first be directed to some fundamental operations of the algorithms.

Fundamental Algorithms

Two important operations in the algorithms are the split and merge VRF operations. A split VRF will detach a CE router from one VRF, and attach it to another VRF. The other VRF can already exist, or will be created specifically for the CE.

A split may be appropriate due to, for example, a change in VPN membership. That is, a CE router has been added to another VPN or removed from a VPN. Taking the first case, assume a CE is one of several CEs attached to a VRF. The CE is then added to another VPN, in which case the VPN membership property of the VRF will no longer match the actual VPN membership. Hence, another VRF must be found to attach the CE or, if none exists, another VRF must be created for the CE. The VRF that is being attached to must have the same VPN membership as the CE.

Figure 12:
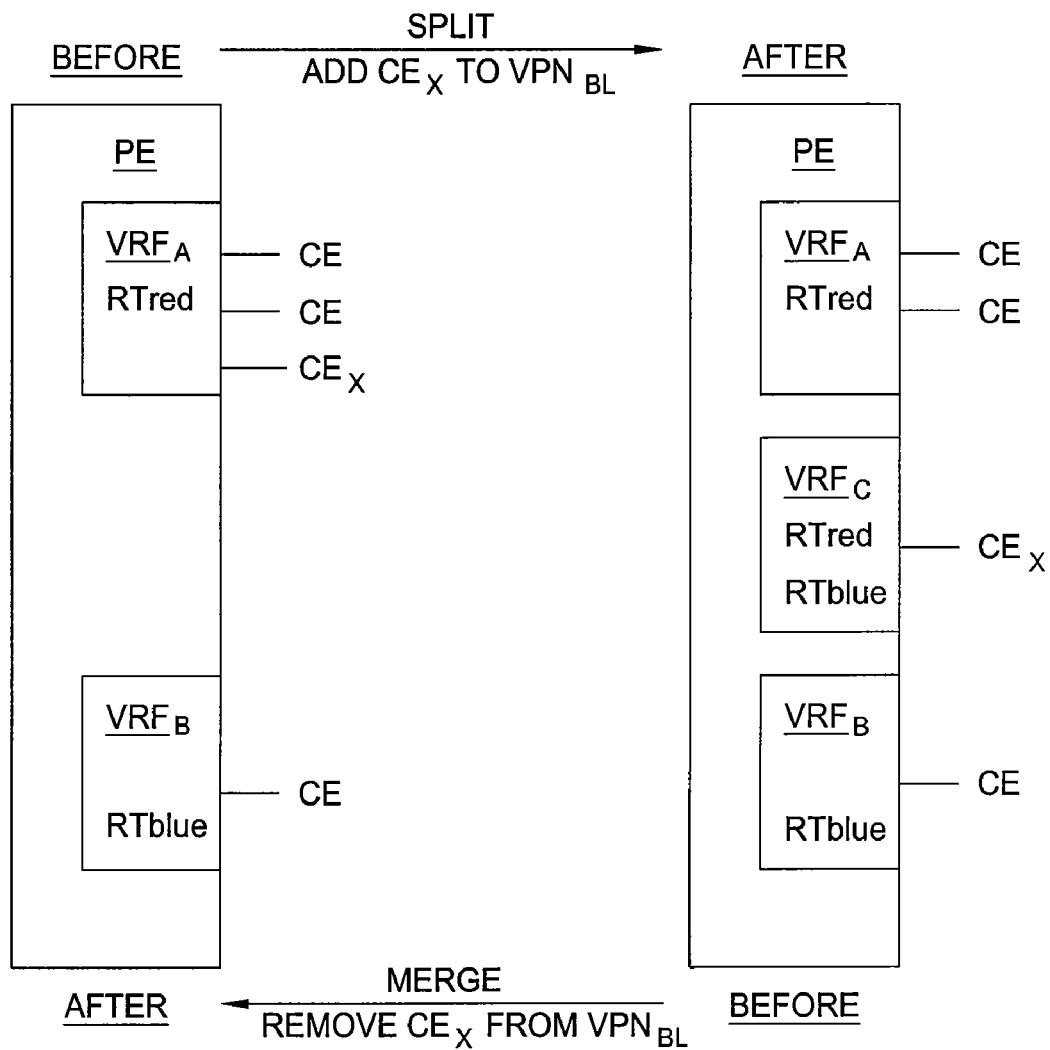
FIG. 12 graphically depicts a VRF splitting operation as a result of adding a new CE to a VPN and a converse merge operation.
Figure 13:
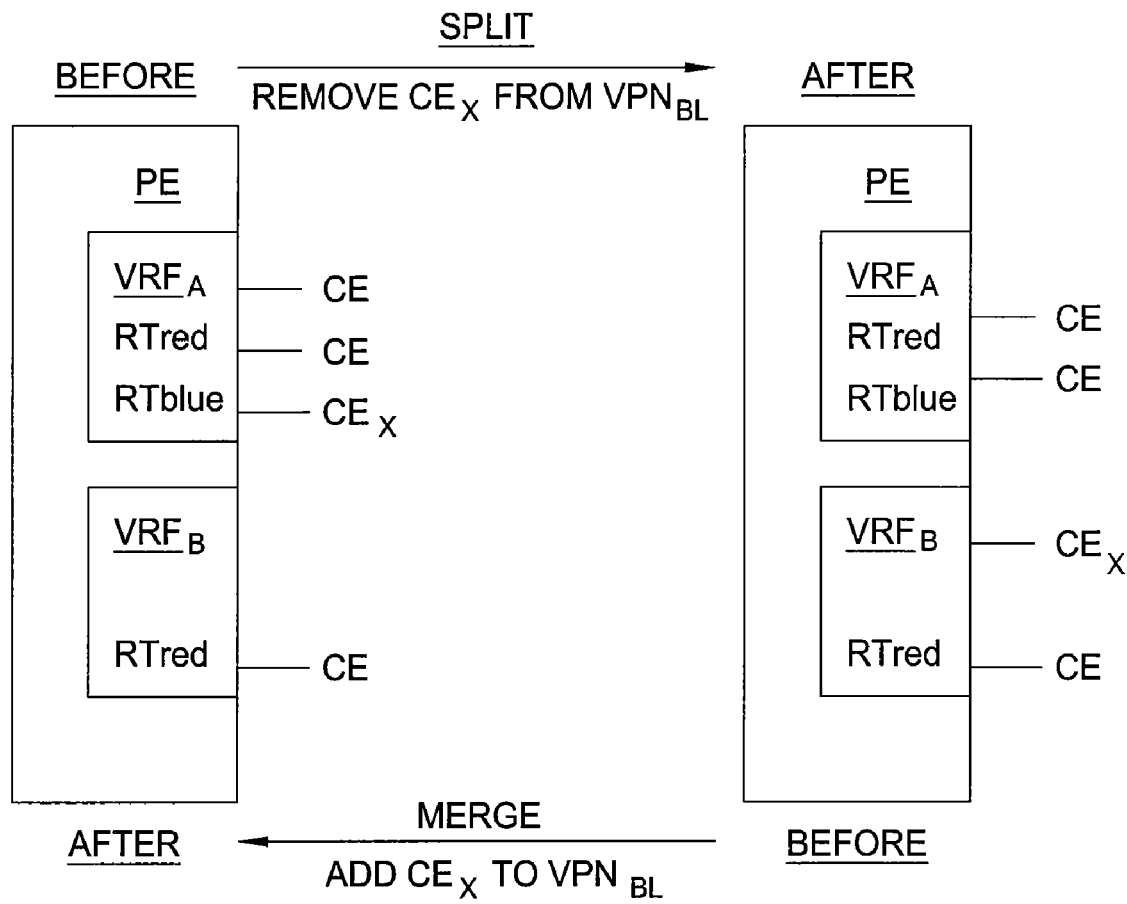
FIG. 13 graphically depicts a VRF splitting operation as a result of deleting a CE from a VPN and a converse merge operation.

The split cases of adding a CE to another VPN and removing the CE from a VPN are illustrated in, respectively, FIG. 12 and FIG. 13. Specifically, FIG. 12 graphically depicts a VRF splitting operation as a result of adding a new CE to a VPN and a converse merge operation, while FIG. 13 graphically depicts a VRF splitting operation as a result of deleting a CE from a VPN and a converse merge operation.

A merge or "join" operation is the converse of the two splits given above; the 'AFTER' column becomes the 'BEFORE' column. The converse scenario for FIG. 12 is a merge due to a removal of $CE_X$ from the VPN. In it is a merge as a result of adding $CE_X$ to the blue VPN.

The converse scenario for FIG. 12 as implemented by $VRF_C$ to which $CE_X$ is to $VRF_A$ (merge operation).

Full-Mesh VPNs

With respect to the full-mesh VPN, there are two possible operations on a CE: adding a CE to a VPN, and removing a CE from a VPN. There are further two considerations for adding a CE to a VPN, namely, is the CE new, or is the CE already attached to a VRF. In addition, for the case of removing a CE from a VPN, it must be considered whether the CE is part of multiple VPNs.

Adding a New CE Router to a VPN

In this embodiment of a method of the present invention, a brand new customer site ($CE_X$ router) exists which is connected to a PE router (PEY), and it is desired to add $CE_X$ to a VPN. Specifically, $CE_X$ is deleted from the blue VPN, leaving it as a member of only the red VPN. Instead of leaving $CE_X$ as the only CE attached to $VRF_C$, a search for another VRF is performed on the PE router that is a member of the red VPN only. If found, $CE_X$ will be attached to that VRF ($VRF_A$ in this case) and $VRF_C$ will be deleted. Unlike in FIG 12, the VRF is not deleted.

Similarly, the converse for FIG. 13 is when $CE_X$ is added to the blue VPN. $CE_X$ will be removed from $VRF_B$ and attached to VPNm. The method in this case is to attach the CE to an existing VRF table, or to create a new VRF table. The VRF table to which the new CE is connected will only be part of VPNm. FIG. 6 depicts an embodiment of a method of the present invention for connecting a new CE router, $CE_X$, to a VPN, VPNm. In the method 600 of FIG. 6, the CE router, $CE_X$, has the following properties $\{CUST_A, ASN_X, IF_{XY}, PE_Y, VPN_X\}$. That is, the new CE router, $CE_X$, is identified as being from Customer A, as having an Autonomous System Number (ASN) of X, as having an interface (IF) of XY and as being connected to PE, Y. Because the CE router, $CE_X$, is a new router, $VPN_X$ has no value.

The method of FIG. 6 begins at step 602 where a request to add a new CE router to a VPN is received. The method 600 then proceeds to step 604.

At step 604, the PE searches for a VRF table such that a located VRF table has only one VPN, $VPN_m$, and such that the VRF table belongs to the CE customer, Customer A. If a VRF table meeting the requirements is found the method 600 proceeds to step 606. If a VRF table meeting the requirements is not found the method 600 proceeds to step 608.

At step 606, the new CE router is attached to the VRF table found. The method 600 is then exited.

At step 608, a new VRF table is created having a Routing Table identifying the properties of the new CE router and the CE router is attached to the newly created VRF table using the interface identified in the CE router properties. The method 600 is then exited.

Adding an Existing CE Router (Already in a VPN) to Another VPN

In this embodiment of a method of the present invention, a CE router that is already part of one or more VPNs exists, and it is desired to add this CE router to another VPN. In order to abide by the rules on maintaining VRF correctness described previously, adding a CE router to another VPN may require "splitting" the CE from the VRF and either adding the CE router to another VRF (merge) or creating a new VRF. The simplest case is if the CE router is the only CE connected to its VRF, that is, the VRF has not connected to multiple CE routers. In this case, the VRF only needs to be modified to include another VPN (i.e., add an RT to the VRF table). However, to optimize VRF usage, it is determined whether it is possible to utilize an already existing VRF table (i.e., performing a merge). A more complex case arises when there are multiple CE routers attached to a VRF table.

For example, FIG. 7 depicts an embodiment of a method of the present invention for adding an existing CE to another VPN. The method of FIG. 7 begins with two separate VPNs, and a desire to add a CE router, $CE_X$, which currently exists in a VPN (or VPNs), VPNX, to a another VPN, VPNM. In the method 700 of FIG. 7, the CE router, $CE_X$, has the following properties $\{CUST_A, ASN_X, IF_{XY}, PE_Y, VPN_X\}$. That is, the CE router, $CE_X$, is identified as being from Customer A, as having an Autonomous System Number (ASN) of X, as having an interface (IF) of XY and as being connected to PE, Y. Because the CE router, $CE_X$, already belongs to another VPN (or VPNs), $VPN_X$ has a value of $VPN_X=\{VPN_{X1}, VPN_{X2}, VPN_{X3}, \ldots, VPN_{XM}\}$. For the method of FIG. 7, it is assumed that the CE router, $CE_X$, is connected to VRF table, $VRF_A$, which has the following properties $\{RD_A, PE_Y, VPN_X, RT_X, IFY_n, CUST_A\}$.

The method 700 of FIG. 7 begins at step 702 when a request is received to add a CE router currently existing in a first VPN, VPNX, to a second VPN, VPNM. The method then proceeds to step 704.

At step 704 it is determined if the CE router, $CE_X$, is the only CE connected to $VRF_A$. If the CE router, $CE_X$, is the only CE connected to VRFA, then the method 700 proceeds to step 706. If the CE router, $CE_X$, is not the only CE connected to $VRF_A$, then the method 700 proceeds to step 712.

At step 706, it is determined if a VRF table exists with the same customer, Customer A, as the CE router, $CE_X$, and having the same set of VPNs, $VPN_X$ and $VPN_M$. If such a VRF table, $VRFY_n$, exists the method 700 proceeds to step 708. If such a VRF table does not exist the method 700 proceeds to step 710.

At step 708, the CE router, $CE_X$, is connected to the located VRF table, VRFYn, that meets the above conditions (i.e., the VRF tables are merged). The method 700 then proceeds to step 708-1.

At step 708-1, the CE router, $CE_X$, is disassociated with the previous VRF table, VRFA, and is associated with the located VRF table, VRFYn. The method 700 then proceeds to step 708-2.

At step 708-2, the VRF table, $VRF_A$, is deleted. The method 700 is then exited.

At step 710, a Route Target Value, RTM, of the second VPN, VPNM, is added to the VRF table, $VRF_A$, of the CE router, $CE_X$. The method 700 is then exited.

At step 712, it is determined if a VRF table exists with the same customer, Customer A, as the CE router, $CE_X$, and having the interested set of VPNs, $VPN_X$ and $VPN_M$. If such a VRF table, $VRF_{Yn}$, exists the method 700 proceeds to step 714. If such a VRF table does not exist the method 700 proceeds to step 718.

At step 714, the CE router, $CE_X$, is split from the original VRF table, $VRF_A$. That is, the CE router, $CE_X$, is disassociated with the previous VRF table, $VRF_A$. The method 700 then proceeds to step 716.

At step 716, the CE router, $CE_X$, is merged with the located VRF table, $VRFY_n$. That is, the CE router, $CE_X$, is associated with the located VRF table, $VRFY_n$. The method 700 is then exited.

At step 718, a new VRF table is created with the same set of RTs as the original VRF table, $VRF_A$, to which the CE router, $CE_X$, was connected. The method 700 then proceeds to step 720.

At step 720, the route target, RTM, of the second VPN, $VPN_M$, is added to the newly created VRF table. The method 700 then proceeds to step 722.

At step 722, the CE router, $CE_X$, is split from the previous VRF table, $VRF_A$. That is the CE router, $CE_X$, is disassociated with the previous VRF table, $VRF_A$. The method 700 then proceeds to step 724.

At step 724, the CE router, $CE_X$, is merged with the newly created VRF table. That is, the CE router, $CE_X$, is associated with the newly created VRF table. The method 700 is then exited.

With regards to the above methods, 600 and 700, of the present invention depicted in FIG. 6 and FIG. 7, it should be noted that a search for a VRF, ($VRF_{Yn}$), with the same set of VPNs and customer as the CE router, $CE_X$, may return multiple VRFs. In such a case, the choice of VRF is arbitrary and the CE router, $CE_X$, may be connected to any of the returned VRFs. This will only happen if a network has been provisioned without using the rules and methods of the present invention.

Removing a CE Router from a VPN

In this embodiment of a method of the present invention, a CE router that is already part of one or more VPNs exists, and it is desired to remove this CE router from at least one VPN. If the CE is only participating in one VPN, then the CE router is essentially being removed from the network. If, however, the CE is participating in multiple VPNs, several checks need to be made to assure that the rules previously described above are followed.

For example, FIG. 8 depicts an embodiment of a method of the present invention for removing an existing CE router from a VPN. Specifically, a CE router, $CE_X$, is in one or more VPNs and it is desired to remove it from $VPN_X$. In the method 800 of FIG. 8, the CE router, $CE_X$, has the following properties $\{CUST_A, ASN_X, IF_{XY}, PE_Y, VPN_X\}$. That is, the CE router, $CE_X$, is identified as being from Customer A, as having an Autonomous System Number (ASN) of X, as having an interface (IF) of XY and as being connected to PE, Y. $VPN_X$ has a value of $VPN_X = \{VPN_{X1}, VPN_{X2}, VPN_{X3}, \ldots, VPN_{XM}\}$, which are the VPNs where the CE router, $CE_X$, participates. For the method of FIG. 8, it is assumed that the CE router, $CE_X$, is connected to VRF table, $VRF_A$, which has the properties $\{RD_A, PE_Y, VPN_X, RT_X, IF_{Yn}, CUST_A\}$.

The method 800 of FIG. 8 begins at step 802 when a request is received to remove a CE router from a VPN (illustratively the VPN, $VPN_{X1}$). The method then proceeds to step 804.

At step 804 it is determined if the CE router, $CE_X$, is present in any other VPNs. If the CE router, $CE_X$, is not in any other VPNs (i.e., $VPN_X = \{VPN_{X1}\}$), then the method 800 proceeds to step 806. If the CE router, $CE_X$, is present in another VPN, then the method 800 proceeds to step 808.

At step 806, the CE router, $CE_X$, is disassociated from the VRF table, $VRF_A$, and if the VRF table, $VRF_A$, has no other CE connections, the VRF table, $VRF_A$, is deleted. The method 800 is then exited.

At step 808, it is determined if the CE router, $CE_X$, is the only CE connected to the VRF table, $VRF_A$. If the CE router, $CE_X$, is the only CE connected to the VRF table, $VRF_A$, then the method 800 proceeds to step 810. If the CE router, $CE_X$, is not the only CE connected to the VRF table, $VRF_A$, then the method 800 proceeds to step 814.

At step 810, the VPN, $VPN_{X1}$, is removed from the VRF table, $VRF_A$, and the RT associated with the VPN, $VPN_{X1}$, is removed from the VRF table, $VRF_A$. The method 800 then proceeds to step 812.

At step 812 it is determined if a VRF table exists with the same properties $\{RD_A, PE_Y, newVPN_X, RT_X, IF_{Yn}, CUST_A\}$ as the modified VRF table, $newVRF_A$. If such a VRF table exists and if none of the VPNs in the new VPN, $newVPN_X$, are hub-and-spoke VPNs, the modified VRF table, $newVRF_A$, is merged with the VRF table found. The method 800 is then exited. If no such VRF table exists, the method 800 is exited. (The merge of this step is described below with respect to method 850 of FIG. 8a).

At step 814, it is determined if a VRF table exists with the same VPN set, $VPN_X$, and Customer, Customer A, as the CE router, $CE_X$. If such a VRF table, $VRF_{Yn}$, exists the method 800 proceeds to step 816. If such a VRF table does not exist, the method 800 proceeds to step 820.

At step 816, the CE router, $CE_X$, is split from the original VRF table, $VRF_A$. That is, the CE router, $CE_X$, is disassociated with the previous VRF table, $VRF_A$. The method 800 then proceeds to step 818.

At step 818, the CE router, $CE_X$, is merged with the located VRF table, $VRF_{Yn}$ that meets the above conditions. That is, the CE router, $CE_X$, is associated with the located VRF table, $VRF_{Yn}$. The method 800 is then exited.

At step 820, a new VRF table is created with the same set of RTs as the original VRF table, $VRF_A$, to which the CE router, $CE_X$, was connected, minus the RT for the VPN, $VPN_{X1}$. The method 800 then proceeds to step 822.

At step 822, the CE router, $CE_X$, is split from the original VRF table, $VRF_A$. That is, the CE router, $CE_X$, is disassociated with the previous VRF table, $VRF_A$. The method 800 then proceeds to step 824.

At step 824, the CE router, $CE_X$, is merged with the newly created VRF table. That is the CE router, $CE_X$, is associated with the newly created VRF table. The method 800 is then exited.

In the embodiment of the invention disclosed with respect to the method 800 of FIG. 8, a new VRF is created before splitting the CE from the old VRF for minimizing the disruption of the network.

As previously described above it should be noted that a search for a VRF, ($VRF_{Yn}$), with the same set of VPNs and customer as the CE router, $CE_X$, may return multiple VRFs. In such a case, the choice of VRF is arbitrary and the CE router, $CE_X$, may be connected to any of the returned VRFs. This will only happen if a network has been provisioned without using the rules and methods of the present invention.

FIG. 8a depicts an embodiment of a method of the present invention for the merge process of step 812 of the method 800 of FIG. 8. The method 850 of FIG. 8a begins at step 852 where the modified VRF table, $newVRF_A$, needs to be merged with another VRF table. The method 850 then proceeds to step 854.

At step 854, it is determined if a VRF table, $VRF_{Yn}$, exists with the same customer, Customer A, as the modified VRF table, $newVRF_A$, and having the same set of VPNs, $\{VPN_{X2}, VPN_{X3}, \ldots, VPN_{XM}\}$. If such a VRF table, $VRF_{Yn}$, exists the method 850 proceeds to step 856. If such a VRF table does not exist the method 850 is exited.

At step 856, all CEs connected to the modified VRF table, $newVRF_A$, are moved to the found VRF table, $VRF_{Yn}$. That is, each interface, $If_{Yn}$, of the modified VRF table, $newVRF_A$, is disassociated with the modified VRF table, $newVRF_A$, and are associated with the found VRF table, $VRF_{Yn}$. The method 850 then proceeds to step 858.

At step 858, the modified VRF table, $newVRF_A$, is deleted. The method 850 is then exited.

Hub-and-Spoke VPNs

With respect to the Hub-and-Spoke methods of the present invention, the methods of the present invention for optimal assignment of CE routers to VPNs and VRF tables while maintaining correct and optimal design takes a simpler form keeping in mind that Multi-site Hub or Spoke CE routers are not allowed. As such, if any of the VPNs on a VRF are a Hub and Spoke VPN, then only one CE may be attached to the VRF. The only complexity occurs when attaching a hub or spoke CE router to a VRF that has only full-mesh VPNs on it. The methods of the present invention will be disclosed below using three separate scenarios namely, adding a new CE; adding an existing CE; and removing a CE.

Adding a New CE Router to a Hub-and-Spoke VPN

In this embodiment of a method of the present invention, a brand new customer site ($CE_X$ router) exists which is connected to a PE router ($PE_Y$), and it is desired to add $CE_X$ to a $VPN_m$. The method in this case is to create a new VRF table to which the new CE is connected and is only part of $VPN_m$. This is different than in the full-mesh scenario where the CE was attached to an existing VRF table if possible. FIG. 9 depicts an embodiment of a method of the present invention for connecting a new CE router, $CE_X$, to a Hub-and-Spoke VPN, $VPN_m$. In the method 900 of FIG. 9, the CE router, $CE_X$, has the following properties $\{CUST_A, ASN_X, If_{XY}, PE_Y, VPN_X\}$. That is, the new CE router, $CE_X$, is identified as being from Customer A, as having an Autonomous System Number (ASN) of X, as having an interface (IF) of XY and as being connected to PE, Y. Because the CE router, $CE_X$, is a new router, $VPN_X$ has no value.

The method of FIG. 9 begins at step 902, where a request to add a new CE router to a Hub-and-Spoke VPN is received. The method 900 then proceeds to step 904.

At step 904, a new VRF table is created having a PE router, $PE_Y$, identifying the properties of the new CE router, $\{PE_Y, VPN=\{VPN_m\}, RT$ for $VPN_m, IF_{Yn}=\{IF_{YX}\}, CUST_A\}$. The CE router is then attached to the newly created VRF table using the interface identified in the CE router properties. The method 900 is then exited.

Adding an Existing CE Router (Already in a VPN) to a Hub-and-Spoke VPN

In this embodiment of a method of the present invention, a CE router that is already part of one or more VPNs exists, and it is desired to add this CE router to a Hub-and-Spoke VPN. However in this embodiment of the present invention, since the CE router is to be part of a Hub-and-Spoke VPN, a VRF table to which the CE is to be attached may only be associated with this CE router. If there are multiple CEs on the VRF, the CE must be split from the VRF. As such, there are no merge considerations in utilizing existing VRF tables.

For example, FIG. 10 depicts an embodiment of a method of the present invention for adding an existing CE router to a Hub-and-Spoke VPN. The method of FIG. 10 begins in the simplest case with two separate VPNs, and a desire to add a CE router, $CE_X$, which currently exists in a first, $VPN_X$, to a second Hub-and-Spoke VPN, $VPN_M$. In the method 1000 of FIG. 10, the CE router, $CE_X$, has the following properties $\{CUST_A, ASN_X, If_{XY}, PE_Y, VPN_X\}$. That is, the CE router, $CE_X$, is identified as being from Customer A, as having an Autonomous System Number (ASN) of X, as having an interface (IF) of XY and as being connected to PE, Y. Because the CE router, $CE_X$, already belongs to one or more VPNs, $VPN_X$ has a value of $VPN_X=\{VPN_{X1}, VPN_{X2}, VPN_{X3}, \ldots, VPN_{XM}\}$. For the method 1000 of FIG. 10, it is assumed that the CE router, $CE_X$, is connected to VRF table, $VRF_A$, which has the following properties $\{RD_A, PE_Y, VPN_X, RT_X, IF_{Yn}, CUST_A\}$.

The method 1000 of FIG. 10 begins at step 1002 when a request is received to add a CE router currently existing in a first VPN, $VPN_X$, to a second Hub-and-Spoke VPN, $VPN_M$. The method then proceeds to step 1004.

At step 1004 it is determined if the CE router, $CE_X$, is the only CE connected to $VRF_A$. If the CE router, $CE_X$, is the only CE connected to $VRF_A$, then the method 1000 proceeds to step 1006. If the CE router, $CE_X$, is not the only CE connected to $VRF_A$, then the method 1000 proceeds to step 1008.

At step 1006, the Hub-and-Spoke VPN, $VPN_M$, is connected to the VRF table, $VRF_A$ by adding the appropriate RT's for $VPN_M$. The method 1000 is then exited.

At step 1008, a new VRF table is created with the same set of RTs as the original VRF table, $VRF_A$, to which the CE router, $CE_X$, was connected and the CE router, $CE_X$, is split from the original VRF table, $VRF_A$. The method 1000 then proceeds to step 1010.

At step 1010, the route targets, $RT_M$, of the second VPN, $VPN_M$, are added to the newly created VRF table. The method 1000 then proceeds to step 1012.

At step 1012, the CE router, $CE_X$, is disassociated with the previous VRF table, $VRF_A$. The method 1000 then proceeds to step 1014.

At step 1014, the CE router, $CE_X$, is associated with the newly created VRF table. The method 1000 is then exited.

Removing a CE Router from a Hub-and-Spoke VPN

In this embodiment of a method of the present invention, a CE router that is already part of one or more VPNs exists, and it is desired to remove this CE router from a Hub-and-Spoke VPN. Since the CE is a Hub or a Spoke, this will be the only CE attached to the associated VRF. If the CE is only participating in one VPN, then the CE router is essentially being removed from the network. If, however, the CE is participating in multiple VPNs, several checks need to be made to assure that the rules previously described above are followed. Furthermore, if all the other VPNs are not Hub-and-Spoke VPNs, a merge may be allowed to take place.

For example, FIG. 11 depicts an embodiment of a method of the present invention for removing an existing CE router from a Hub-and-Spoke VPN. The method in FIG. 11 begins with a CE router, $CE_X$, which is part of several VPNs, $VPN_X$, and it is desired to remove $CE_X$ from VPN, $VPN_{X1}$. Note that CE router, $CE_X$, is a hub or spoke in VPN, $VPN_{X1}$. In the method 1100 of FIG. 1, the CE router, $CE_X$, has the following properties $\{CUST_A, ASN_X, IF_{XY}, PE_Y, VPN_X\}$. That is, the CE router, $CE_X$, is identified as being from Customer A, as having an Autonomous System Number (ASN) of X, as having an interface (IF) of XY and as being connected to PE, Y. $VPN_X$ has a value of $VPN_X=\{VPN_{X1}, VPN_{X2}, VPN_{X3}, \ldots, VPN_{XM}\}$, which are the VPNs where the CE router, $CE_X$, participates. For the method of FIG. 11, it is assumed that the CE router, $CE_X$, is connected to VRF table, $VRF_A$, which has the properties $\{RDA, PE_Y, VPN_X, RT_X, IF_{Ym}, CUST_A\}$.

The method 1100 of FIG. 1 begins at step 1102 when a request is received to remove a CE router from a Hub-and-Spoke VPN (illustratively the VPN, $VPN_{X1}$). The method then proceeds to step 1104.

At step 1104 it is determined if the CE router, $CE_X$, is present in any other VPNs. If the CE router, $CE_X$, is not in any other VPNs (i.e., $VPN_X=\{VPN_{X1}\}$), then the method 1100 proceeds to step 1106. If the CE router, $CE_X$, is present in another VPN, then the method 1100 proceeds to step 1110.

At step 1106, the CE router, $CE_X$, is disassociated from the VRF table, $VRF_A$. The method 1100 then proceeds to step 1108.

At step 1108, if the VRF table, $VRF_A$, has no other CE connections, the VRF table, $VRF_A$, is deleted. The method 1100 is then exited.

At step 1110, it is determined if the CE router, $CE_X$, is the only CE connected to the VRF table, $VRF_A$. If the CE router, $CE_X$, is the only CE connected to the VRF table, $VRF_A$, then the method 1100 proceeds to step 1112. If the CE router, $CE_X$, is not the only CE connected to the VRF table, $VRF_A$, then the method 1100 proceeds to step 1116.

At step 1112, the VPN, $VPN_{X1}$, is removed from the VRF table, $VRF_A$, and the RT associated with the VPN, $VPN_{X1}$, is removed from the VRF table, $VRF_A$. The method 1100 then proceeds to step 1114.

At step 1114 it is determined if a VRF table exists with the same properties $\{RD_A, PE_Y, newVPN_X, RT_X, IF_{Ym}, CUST_A\}$ as the modified VRF table, $newVRF_A$. If such a VRF table exists and if none of the VPNs in the new VPN, $newVPN_X$, are hub-and-spoke VPNs, the modified VRF table, $newVRF_A$, is merged with the PE, $PE_Y$. The method 1100 is then exited. If no such VRF table exists, the method 1100 is exited.

At step 1116, a new VRF table is created with the same set of RTs as the original VRF table, $VRF_A$, to which the CE router, $CE_X$, was connected minus the RT for the VPN, $VPN_{X1}$. The method 1100 then proceeds to step 1118.

At step 1118, the CE router, $CE_X$, is split from the original VRF table, $VRF_A$. That is, the CE router, $CE_X$, is disassociated from the original VRF table, $VRF_A$. The method 1100 then proceeds to step 1120.

At step 1120, the CE router, $CE_X$, is merged with the newly created VRF table. That is, the CE router, $CE_X$, is associated with the newly created VRF table. The method 1100 is then exited.

In the embodiment of the invention disclosed with respect to the method 1100 of FIG. 11, a new VRF is created before splitting the CE from the old VRF for minimizing the disruption of the network.

Intranet vs. Extranet Considerations

An intranet VPN is a VPN where all CEs belong to the same customer. An extranet VPN is a VPN with more than one customer, meaning CEs belonging to different customers are in the VPN.

Rule a states that all CEs attached to a VRF belong to the same customer (actually, "CEs from two different Customers cannot connect to the same VRF"). This has already been considered in the algorithms, since two checks are performed when selecting a VRF to which to attach a CE:

Check that the VRF has the same VPN(s) as the CE; and check that the VRF belongs to the same customer as the CE.

Because of the second check, two different customer CEs will never attach to the same VRF, even if they are in the same VPN (an extranet VPN).

The inventors contemplate that some might consider attaching two customers to the same VRF acceptable. Though this violates rule a, this is allowed in various embodiments, and the customer check is taken out of the algorithm. An important reason for rule a, however, is for administrative separation, so as to have more control over inter-customer traffic, even if they're in the same VPN. For example, route maps could be put on a VRF to restrict which addresses are advertised.

Protocol Considerations

Part of the VRF configuration, is the consideration of the routing protocol running between the VRF and CE router. These protocols include BGP, OSPF, RIPv2, IS-IS and EIGRP. Or the customer could choose to run no protocol on the CE, in which case static routes on the VRF will be used. The PE-CE routing protocol has no affect on the above algorithms, with one exception: EIGRP.

EIGRP requires an Autonomous System Number (ASN) be given when put on a VRF. This is the ASN of the CE router. EIGRP, being an IGP, cannot run on two different ASN's. Hence, there is one new rule for maintaining correct design of a VPN:

f. If EIGRP is the routing protocol running between the CE and PE, then all CEs running EIGRP that are attached to the VRF, must be in the same ASN.

Stated another way, CEs running EIGRP that have different ASNs cannot connect to the same VRF.

In order to implement this rule in the algorithms, it is appropriate to keep track of which protocols are running between CE and PE routers, as both an additional property of a CE router, and an additional property of the VRF. Specifically, for the VRF it is preferable to know if the VRF has EIGRP on any CE connections and, if so, which ASN it is for. There are only minor algorithms changes for adding or removing from a VPN a CE that is running EIGRP. There is, however, one special case to consider for EIGRP: the connection between the CE and PE is modified to run EIGRP.

Four cases for a CE running EIGRP will be briefly outlined: (1) attaching a new CE to a VPN; (2) adding an existing CE to another VPN; (3) removing a CE from a VPN; and (4) modifying the CE-PE protocol to be EIGRP. Only the Full-Mesh cases will be considered, since Hub-and-Spoke cases have only one CE per VRF. There is no special processing for items (2)-(3), items (1) and (4) will now be discussed:

Add a CE Running EIGRP to a VPN

In this case, it is appropriate to attach the CE to a VRF that is already running EIGRP, and all CEs that are running attached to that VRF via EIGRP interfaces are in the same ASN as the CE intended to be attached.

An exemplary methodology is as follows:

(1) Get a list of all VRFs on the PE that are in this VPN exclusively;

(2) In this list, find a VRF that has EIGRP, and EIGRP is for the same ASN as the CE's ASN;

(3) IF such a VRF exists,

THEN attach the CE to that VRF,

ELSE attach the CE to one of the other VRFs (not running EIGRP) if any exist;

ELSE, create a new VRF.

Modify the Protocol on a CE

There is no special processing if changing the protocol for EIGRP to any other protocol. However, changing the protocol to EIGRP requires modified processing:

(1) IF the VRF to which the CE is attached has other CE running EIGRP and those CE routers are in the same ASN;

(2) THEN change the protocol to EIGRP (no special processing);

(3) ELSE Split the CE from its current VRF and try to find another VRF to attach to.

Multi-Site Hub or Spoke

One of the major assumptions on provisioning VPNs is that multi-site Hub or Spoke VRF (i.e., a VRF with more than one CE attached) will not be allowed. The rationale for this was first, that two spoke CEs attached to the same VRF wouldn't be true spokes, and second, a multi-site hub would create a single point of failure, and hence defeat the purpose of a hub.

However, in one embodiment of the invention, rule c is relaxed to allow multi-site hubs and/or spokes. In this case, the hub-and-spoke algorithms are substantially similar to the full-mesh algorithms. Multi-site hubs and spokes still have one constraint; namely, that a hub CE and a spoke CE cannot be attached to the same VRF. This is because one cannot configure a VRF to be both a hub VRF and spoke VRF. As previously outlined, a hub VRF will set the hub RT to export (or both) and the spoke RT to import; in contrast, the spoke VRF will set the hub RT to import and the spoke RT to export.

Therefore, allowing multi-site hub and spoke VPNs require rule c be changed as follows:

c. A Hub CE and a Spoke CE cannot connect to the same VRF.

As appreciated by those skilled in the art, the above change is also implemented in the various methods and figures previously described.

The above-described embodiments of the invention may be implemented within the context of methods, computer readable media and computer program processes associated with CE routers, PE routers, management layer devices and the like. Specifically, network elements described above as performing various aspects of the present invention may be implemented as described above or as described below.

Generally speaking, methods according to the invention may be implemented using computing devices having a processor as well as memory for storing various control programs, other programs and data. The memory may also store an operating system supporting the programs. The processor cooperates with conventional support circuitry such as power supplies, clock circuits, cache memory and the like as well as circuits that assist in executing the software routines stored in the memory. As such, it is contemplated that some of the steps discussed herein as software processes may be implemented within hardware, for example as circuitry that cooperates with the processor to perform various steps. Input/output (I/O) circuitry forms an interface between the various functional elements communicating with the device.

The computing device is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The computing device may be configured to operate as (or as part of) any of a CE router, a PE router, a management device or a control server. Thus, in addition to the respective switching/routing/control functions, a CE/PE router, management device or control server may also perform the various control functions detailed herein.

The invention may also be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
    determining virtual private network (VPN) membership for each of a plurality of customer edge (CE) routers, each VPN being associated with at least one respective VPN route forwarding (VRF) table, each VRF table being associated with at least one respective VPN;
    attaching to each VRF table those CE routers having membership in the at least one VPN associated with the respective VRF table; and
    adding a CE router to a first VPN, said CE router being attached to a VRF table associated with a second VPN, said step of adding comprising:
    splitting said CE router from said VRF table associated with said second VPN; and
    in response to the existence of a VRF table being associated with said first VPN and said second VPN, attaching said new CE to said VRF table;
    in response to the absence of a VRF table being associated with said first VPN and said second VPN, creating a new VRF table identifying the properties of the new CE router and attaching said new CE to said created VRF table using an interface identified in the new CE router properties.

2. The method of claim 1, wherein:
    each VRF table supporting a respective VPN has attached to it CE routers from only one customer.

3. The method of claim 1, wherein:
    at least one VRF table supporting multiple VPNs has attached to it CE routers supporting a plurality of customers.

4. The method of claim 1, wherein said VRF tables are only associated with VPNs within one of a mesh topology and a hub and spoke topology.

5. The method of claim 4, wherein:
    a VRF table is constrained to have attached to it one of either hub CE routers or spoke CE routers.

6. The method of claim 1, further comprising:
    adding a CE router to a first customer VPN, said CE router not being attached to a VRF table, said step of adding comprising:
    in response to the existence of a VRF table being associated with said first VPN, attaching said new CE to said VRF table being associated with said first VPN;
    in response to the absence of a VRF table being only associated with said first VPN, creating a new VRF table identifying the properties of the new CE router and attaching said new CE to said created VRF table using an interface identified in the new CE router properties.

7. The method of claim 6, wherein:
    the properties of each of said CE router identify a respective customer (CUST), autonomous system number (ASN), interface (IF) and connected provider edge (PE).

8. The method of claim 1, further comprising:
    adding a CE router to a first VPN, said CE router being attached to a VRF table associated with a plurality of VPNs, said step of adding comprising:

if said CE router is the only CE router associated with the VRF table, then adding at least one route target (RT) to the VRF table to associate the VRF table with the first VPN.

9. A method, comprising:
determining virtual private network (VPN) membership for each of a plurality of customer edge (CE) routers, each VPN being associated with at least one respective VPN route forwarding (VRF) table, each VRF table being associated with at least one respective VPN;
attaching to each VRF table those CE routers having membership in the at least one VPN associated with the respective VRF table; and
removing a first CE router from one of a plurality of VPNs to which the CE router participates, said one VPN being associated with a first VRF table, said step of removing comprising:
in response to the existence of a VRF table being associated with said plurality of VPNs with the exclusion of said one VPN, attaching said CE to said VRF table;
in response to the absence of such a VRF table, if said CE router is the only CE router associated with the VRF table, removing at least one route target (RT) from the VRF table to disassociate the VRF table from the first VPN;
in response to the absence of such a VRF table, if said CE router is not the only CE router associated with the VRF table:
creating a second VRF table using a modified route target (RT) attribute of said first VRF table, said modification comprising the exclusion of said one VPN from said RT attribute;
disassociating said first CE router from said first VRF table; and
associating said first CE router with said second VRF table.

10. The method of claim 9, wherein:
said step of creating a second VRF table is performed prior to said step of disassociating said first CE router from said first VRF table.

11. The method of claim 9, further comprising:
deleting said first VRF table if no other CE routers are associated thereto.

12. The method of claim 1, wherein:
if the routing protocol between a PE router and a CE router comprises the Extended Interior Gateway Routing Protocol (EIGRP), then all CE routers running EIGRP within the VRF table are within the same Autonomous System (AS).

13. A computer program product stored on a computer readable medium, the computer program product including computer instructions which, when processed by a computer, cause the computer to perform a method, the method comprising:
determining virtual private network (VPN) membership for each of a plurality of customer edge (CE) routers, each VPN being associated with at least one respective VPN route forwarding (VRF) table, each VRF table being associated with at least one respective VPN;
attaching to each VRF table those CE routers having membership in the at least one VPN associated with the respective VRF table; and
adding a CE router to a first VPN, said CE router being attached to a VRF table associated with a second VPN, said step of adding comprising:
splitting said CE router from said VRF table associated with said second VPN; and in response to the existence of a VRF table being associated with said first VPN and said second VPN, attaching said new CE to said VRF table;
in response to the absence of a VRF table being associated with said first VPN and said second VPN, creating a new VRF table identifying the properties of the new CE router and attaching said new CE to said created VRF table using an interface identified in the new CE router properties.

14. A control device for causing the routing of data traffic via at least one virtual private network (VPN), said control device including control circuitry for executing a method comprising:
determining VPN membership for each of a plurality of customer edge (CE) routers, each VPN being associated with at least one respective VPN route forwarding (VRF) table, each VRF table being associated with at least one respective VPN;
attaching to each VRF table those CE routers having membership in the at least one VPN associated with the respective VRF table; and
adding a CE router to a first VPN, said CE router being attached to a VRF table associated with a second VPN, said step of adding comprising:
splitting said CE router from said VRF table associated with said second VPN; and
in response to the existence of a VRF table being associated with said first VPN and said second VPN, attaching said new CE to said VRF table;
in response to the absence of a VRF table being associated with said first VPN and said second VPN, creating a new VRF table identifying the properties of the new CE router and attaching said new CE to said created VRF table using an interface identified in the new CE router properties.

15. The control device of claim 14, wherein said control device comprises one of a CE router and a PE router.

16. The control device of claim 15, wherein:
said CE router has associated with it respective customer (CUST), autonomous system number (ASN), interface (IF) and connected provider edge (PE) parameters, said parameters being utilized to determine an appropriate VRF table.

17. The control device of claim 14, further comprising:
adding a CE router to a first VPN, said CE router being attached to a first VRF table associated with a plurality of VPNs, said step of adding comprising:
if said CE router is the only CE router associated with said first VRF table, then adding at least one route target (RT) to the VRF table to associate the VRF table with the first VPN.

18. A computer program product stored on a computer readable medium, the computer program product including computer instructions which, when processed by a computer, cause the computer to perform a method, the method comprising:
determining virtual private network (VPN) membership for each of a plurality of customer edge (CE) routers, each VPN being associated with at least one respective VPN route forwarding (VRF) table, each VRF table being associated with at least one respective VPN;
attaching to each VRF table those CE routers having membership in the at least one VPN associated with the respective VRF table; and removing a first CE router from one of a plurality of VPNs to which the CE router participates, said one VPN being associated with a first VRF table, said step of removing comprising:

in response to the existence of a VRF table being associated with said plurality of VPNs with the exclusion of said one VPN, attaching said CE to said VRF table;

in response to the absence of such a VRF table, if said CE router is the only CE router associated with the VRF table, removing at least one route target (RT) from the VRF table to disassociate the VRF table from the first VPN;

in response to the absence of such a VRF table, if said CE router is not the only CE router associated with the VRF table:

creating a second VRF table using a modified route target (RT) attribute of said first VRF table, said modification comprising the exclusion of said one VPN from said RT attribute;

disassociating said first CE router from said first VRF table; and associating said first CE router with said second VRF table.

19. A control device for causing the routing of data traffic via at least one virtual private network (VPN), said control device including control circuitry for executing a method comprising:

determining virtual private network (VPN) membership for each of a plurality of customer edge (CE) routers, each VPN being associated with at least one respective VPN route forwarding (VRF) table, each VRF table being associated with at least one respective VPN;

attaching to each VRF table those CE routers having membership in the at least one VPN associated with the respective VRF table; and removing a first CE router from one of a plurality of VPNs to which the CE router participates, said one VPN being associated with a first VRF table, said step of removing comprising:

in response to the existence of a VRF table being associated with said plurality of VPNs with the exclusion of said one VPN, attaching said CE to said VRF table;

in response to the absence of such a VRIF table, if said CE router is the only CE router associated with the VRF table, removing at least one route target (RT) from the VRF table to disassociate the VRF table from the first VPN;

in response to the absence of such a VRF table, if said CE router is not the only CE router associated with the VRF table:

creating a second VRF table using a modified route target (RT) attribute of said first VRF table, said modification comprising the exclusion of said one VPN from said RT attribute;

disassociating said first CE router from said first VRF table; and associating said first CE router with said second VRF table.

* * * * *